US009113065B2

(12) United States Patent
Ogata et al.

(10) Patent No.: US 9,113,065 B2
(45) Date of Patent: Aug. 18, 2015

(54) NETWORK CAMERA, NETWORK CAMERA SYSTEM AND MONITORING METHOD

(75) Inventors: Tsuyoshi Ogata, Kanagawa (JP); Yasuji Nakamura, Kanagawa (JP); Hirotaka Fujimura, Kanagawa (JP); Junichi Hamada, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2100 days.

(21) Appl. No.: 12/094,095

(22) PCT Filed: Nov. 16, 2006

(86) PCT No.: PCT/JP2006/322882
§ 371 (c)(1),
(2), (4) Date: May 16, 2008

(87) PCT Pub. No.: WO2007/058269
PCT Pub. Date: May 24, 2007

(65) Prior Publication Data
US 2009/0174770 A1    Jul. 9, 2009

(30) Foreign Application Priority Data
Nov. 18, 2005    (JP) .................................. 2005-334548

(51) Int. Cl.
*H04N 7/18*    (2006.01)
*G06F 15/16*    (2006.01)
(Continued)

(52) U.S. Cl.
CPC ........... *H04N 5/232* (2013.01); *H04N 5/23206* (2013.01); *H04N 5/772* (2013.01);
(Continued)

(58) Field of Classification Search
CPC ..... H04L 43/0876; H04L 43/08; H04L 67/22; H04L 43/06
USPC ........................................... 709/224; 348/143
See application file for complete search history.

(56) References Cited

U.S. PATENT DOCUMENTS

2003/0120390 A1*    6/2003    Hopkins ....................... 700/259
2005/0044258 A1    2/2005    Nakamura
(Continued)

FOREIGN PATENT DOCUMENTS

CN    1592362 A    3/2005
JP    2003-018525    1/2003
(Continued)

OTHER PUBLICATIONS

Chinese Office Action dated Oct. 9, 2009.
(Continued)

*Primary Examiner* — Melvin H Pollack
(74) *Attorney, Agent, or Firm* — Pearne & Gordon LLP (57) ABSTRACT

To provide a network camera and a network camera system in which an image can be securely distributed to a designated distribution recipient. A network camera system 100 connected to a communication network 130 and having a network camera 110 and a plurality of PCs 120, the network camera 110 comprising an image pickup section 111 for picking up the image, a sending and receiving section 115 for distributing the picked up image to the PC 120, an image sending monitoring section 116 for monitoring whether or not the picked up image is distributed to the designated PC 120 among the plurality of PCs 120, and an accumulation memory 119 for accumulating the picked up image when the distribution of the image to the designated PC 120 is interrupted, and the PC 120 comprising an image receiving section 121 for receiving the picked up image distributed thereto.

9 Claims, 6 Drawing Sheets

(51) Int. Cl.
*H04N 5/232* (2006.01)
*H04N 7/173* (2011.01)
*H04N 21/2187* (2011.01)
*H04N 21/231* (2011.01)
*H04N 21/433* (2011.01)
*H04N 21/4788* (2011.01)
*H04N 21/6338* (2011.01)
*H04N 5/77* (2006.01)
*H04N 5/775* (2006.01)
*H04N 5/907* (2006.01)

(52) U.S. Cl.
CPC ....... *H04N7/17309* (2013.01); *H04N 21/2187* (2013.01); *H04N 21/23106* (2013.01); *H04N 21/4334* (2013.01); *H04N 21/4788* (2013.01); *H04N 21/6338* (2013.01); *H04N 5/77* (2013.01); *H04N 5/775* (2013.01); *H04N 5/907* (2013.01)

(56) References Cited

U.S. PATENT DOCUMENTS

| | | | |
|---|---|---|---|
| 2005/0052548 A1* | 3/2005 | Delaney | 348/231.2 |
| 2005/0267922 A1* | 12/2005 | Nakajima et al. | 707/204 |
| 2006/0015781 A1* | 1/2006 | Rothman et al. | 714/100 |
| 2006/0206748 A1* | 9/2006 | Li | 714/4 |
| 2006/0268122 A1* | 11/2006 | Iwasaki et al. | 348/231.3 |
| 2007/0300272 A1 | 12/2007 | Takanezawa | |

FOREIGN PATENT DOCUMENTS

| | | |
|---|---|---|
| JP | 2004-147262 | 5/2004 |
| JP | 2005-026866 | 1/2005 |
| JP | 2005-295255 | 10/2005 |
| JP | 2007-49681 A | 2/2007 |

OTHER PUBLICATIONS

International Search Report Dated Jan. 23, 2007.

* cited by examiner

| SERIAL NUMBER | IMAGE GENERATION DATE AND TIME | DISTRIBUTION RECIPIENT IP | CAMERA NAME |
|---|---|---|---|
| 00000001 | 05.10.15 , 12:09:50 | Client-1, Client-2 | Camera1 |
| 00000002 | 05.10.15 , 12:09:56 | Client-1, Client-2 | Camera1 |
| 00000003 | 05.10.15 , 12:10:02 | Client-1, Client-2 | Camera1 |
| 00000004 | 05.10.15 , 12:10:08 | Client-1, Client-2 | Camera1 |
| ... | ... | ... | ... |
| 00000246 | 05.10.15 , 18:57:08 | Client-1 | Camera1 |

| RECORDING START TIME | RECORDING END TIME | RECORDING INTERVAL | DISTRIBUTION RECIPIENT IP |
|---|---|---|---|
| 8:30 | 22:00 | SIX SECONDS | Client-1, Client-2 |
| 8:30 | 22:00 | SIX SECONDS | Client-1, Client-2 |
| 8:30 | 22:00 | SIX SECONDS | Client-1, Client-2 |
| 8:30 | 22:00 | SIX SECONDS | Client-1, Client-2 |
| 8:30 | 22:00 | SIX SECONDS | Client-1, Client-2 |
| 9:00 | 17:30 | THREE SECONDS | Client-2 |
| — | — | — | — |

NETWORK CAMERA, NETWORK CAMERA SYSTEM AND MONITORING METHOD

TECHNICAL FIELD

The present invention relates to a network camera that can distribute the image to a plurality of distribution recipients via a communication network, a network camera system connected to the communication network and comprising the network camera and the plurality of distribution recipients to which the image is distributed from the network camera, and a monitoring method for use in the network camera system.

BACKGROUND ART

In the conventional network camera, when a network line is temporarily disabled in an FTP client/server system, image data is backed up on the camera side (e.g., refer to patent document 1). In the conventional network camera, one network camera of the client and one FTP server to which the image is distributed from the network camera are connected via a network.
Patent document 1: JP-A-2005-026866

SUMMARY OF THE INVENTION

Problems that the Invention is to Solve

On the other hand, in a system in which the network camera is the server and an indefinite number of clients to which the image is distributed from the network camera are connected via the network, the client may have a monitoring apparatus for monitoring the image of the network camera and a recording apparatus for recording the image data of the network camera.

In this system, when the image of the network camera is backed up, it is not required to securely distribute the image to the monitoring apparatus of the client, but it is requisite to securely distribute the image to the recording apparatus, whereby there is different necessity of accumulating the image depending on the kind of client. Accordingly, it is required to securely distribute the image to the designated distribution recipient in these circumstances.

The invention has been achieved in the light of the above-mentioned circumstances, and it is an object of the invention to provide a network camera, a network camera system and a monitoring method, in which the image can be securely distributed to the designated distribution recipient.

Means for Solving the Problems

In order to accomplish the above object, the present invention provides a network camera for distributing an image to a plurality of receiving apparatuses via a communication network, comprising:
 an image pickup section which picks up the image;
 a sending section which distributes the picked up image to the receiving apparatus that requests a distribution of the picked up image taken by the image pickup section;
 a sending monitoring section which monitors whether or not the picked up image is distributed to the receiving apparatus designated in advance among the plurality of receiving apparatuses by the sending section; and
 an accumulation section which accumulates the picked up image when the distribution of the image to the designated receiving apparatus by the sending section is interrupted while being monitored by the sending monitoring section.

With this configuration, it is possible to securely distribute the image to the designated distribution recipient.

Also, the invention provides the network camera, wherein the accumulation section stops the accumulation of the picked up image when the designated distribution is restored.

With this configuration, the image is accumulated only while the distribution of image to the specific distribution recipient is disabled, whereby the amount of accumulated data in an accumulation section such as memory can be suppressed to the required minimum.

Also, the invention provides the network camera, further comprising: accumulation start information which includes a time from interruption of the distribution to the designated receiving apparatus to the start of accumulation by the accumulation section, wherein the accumulation section starts the accumulation of the picked up image based on the accumulation start information when the distribution to the designated receiving apparatus is interrupted.

With this configuration, when the distribution of the image to the distribution recipient such as the recording apparatus is interrupted upon an instruction of the network camera, the image inputted into the network camera can be accumulated in a specific time after the distribution of image is interrupted.

Also, the invention provides the network camera, further comprising: accumulation interval information which includes a time interval at which the accumulation section accumulates the picked up image, the accumulation section decides the time interval of accumulating the picked up image based on the accumulation interval information when the distribution to the designated receiving apparatus is interrupted.

With this configuration, when the distribution of the image to the distribution recipient such as the recording apparatus is interrupted upon an instruction of the network camera, the image inputted into the network camera can be accumulated at specific time intervals.

Also, the invention provides the network camera, further comprising: an accumulation monitoring section which notifies the receiving apparatus that the picked up image is accumulated by the accumulation section.

With this configuration, the distribution recipient of the image recognizes that the accumulated image exists in the memory, and acquires the accumulated image as needed.

Also, the invention provides the network camera, further comprising: recording time information which includes a recording period indicating a monitoring time zone of monitoring the distribution of the picked up image to the designated receiving apparatus by the sending monitoring section, wherein the accumulation section decides the period of accumulating the picked up image based on the recording time information, when the distribution to the designated receiving apparatus is interrupted.

With this configuration, only when the image inputted into the network camera is not distributed in the specified time zone to the designated distribution recipient upon an instruction of the network camera, the image can be accumulated in the memory.

Also, the invention provides the network camera, further comprising: recording interval information which includes a recording interval indicating a time interval of monitoring the distribution of the picked up image to the designated receiving apparatus by the sending monitoring section, wherein the accumulation section decides the time interval of accumulating the picked up image based on the recording interval information, when the distribution to the designated receiving apparatus is interrupted.

With this configuration, only when the image inputted into the network camera is not distributed at specified time intervals to the designated distribution recipient upon an instruction of the network camera, the image can be accumulated in the memory.

Also, the invention provides a network camera system connected to a communication network, comprising:

a network camera; and a plurality of receiving apparatuses to which an image is distributed from the network camera, wherein the network camera which includes:

an image pickup section which picks up the image;

a sending section which distributes the picked up image taken by the image pickup section to the receiving apparatus;

a sending monitoring section which monitors whether or not the picked up image is distributed to the receiving apparatus designated in advance among the plurality of receiving apparatuses by the sending section; and an accumulation section which accumulates the picked up image when the distribution of the image to the designated receiving apparatus by the sending section is interrupted while being monitored by the sending monitoring section; and wherein the receiving apparatus includes:

a receiving section which receives the picked up image distributed to the designated receiving apparatus by the sending section.

With this configuration, it is possible to securely distribute the image to the designated distribution recipient.

Also, a monitoring method used in a network camera system connected to a communication network and comprising a network camera and a plurality of receiving apparatuses to which an image is distributed from the network camera, the method comprising:

an image pickup step of picking up the image;

a sending step of distributing the picked up image taken at the image pickup process to the receiving apparatus;

a sending monitoring step of monitoring whether or not the picked up image is distributed to the receiving apparatus designated in advance among the plurality of receiving apparatuses at the sending process; and an accumulating step of accumulating the picked up image when the distribution to the designated receiving apparatus at the sending process is interrupted at the sending monitoring process; and a receiving step of receiving the picked up image distributed to the designated receiving apparatus at the sending process.

With this configuration, it is possible to securely distribute the image to the designated distribution recipient.

Effect of the Invention

The invention can provide the network camera, the network camera system and the monitoring method, in which the image can be securely distributed to the designated distribution recipient.

DESCRIPTION OF REFERENCE NUMERALS AND SIGNS 100 network camera system
110 network camera
111 image pickup section
112 signal processing section
113 encoder
114 temporary memory
116 sending and receiving section
116 image sending monitoring section
117 accumulation processing section
118 accumulated capacity monitoring section
119 accumulation memory
120 PC (receiving apparatus)
121 image receiving section
122 accumulated image acquisition request section
123 accumulated image list acquisition section
130 network

BEST MODE FOR CARRYING OUT THE INVENTION

The embodiments of the present invention will be described below with reference to the drawings.

Embodiment

Figure 1:
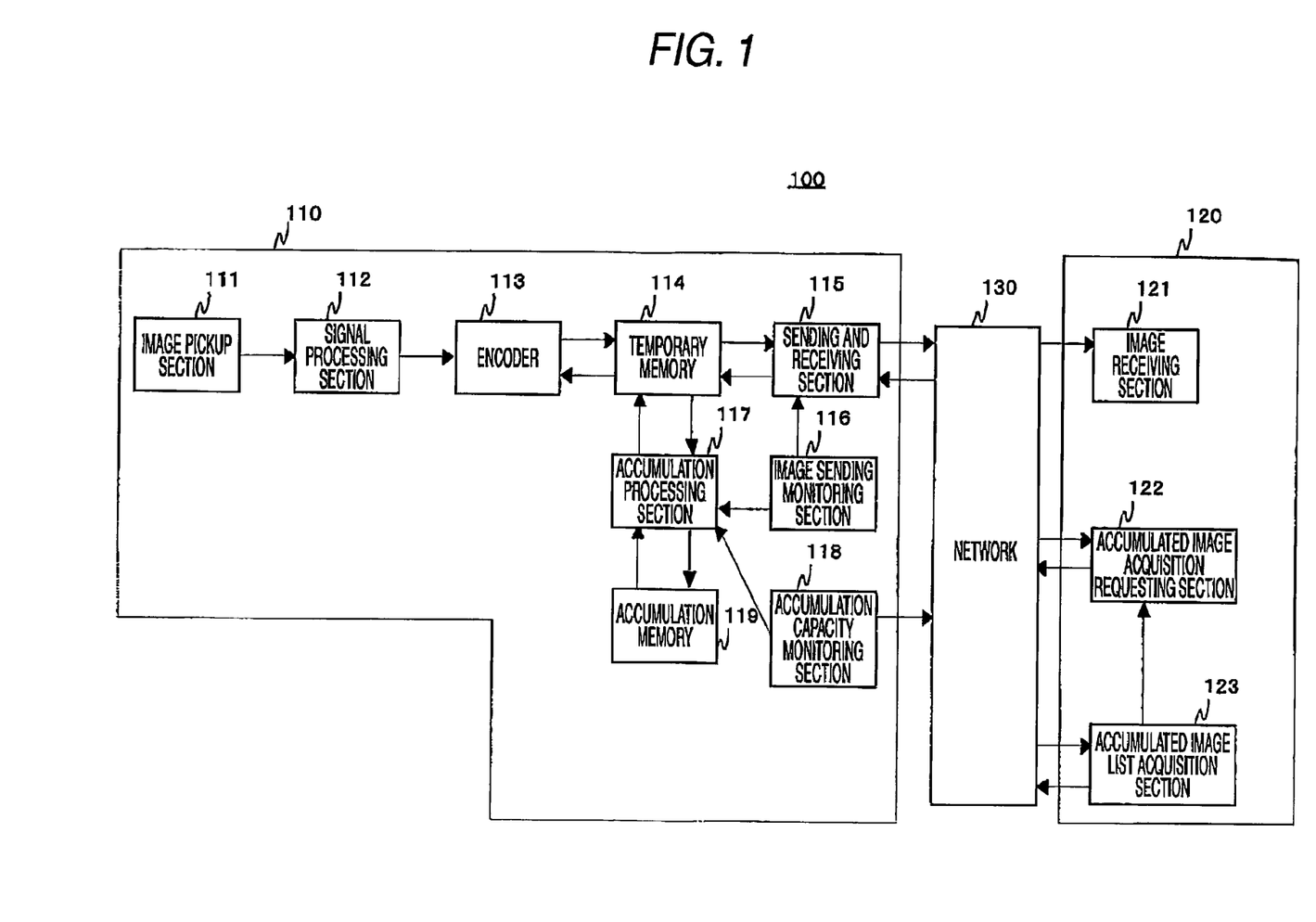
FIG. 1 is a block diagram of a network camera system according to an embodiment of the present invention.

FIG. 1 is a block diagram of a network camera system 100 according to an embodiment of the present invention. The network camera system 100 has a network camera 110, a PC (Personal Computer) 120 and a network 130. The network camera 110 has an image pickup section 111, a signal processing section 112, an encoder 113, a temporary memory 114, a sending and receiving section 115, an image sending monitoring section 116, an accumulation processing section 117, an accumulation capacity monitoring section 118, and an accumulation memory 119. The PC 120 has an image receiving section 121, an accumulated image acquisition requesting section 122, and an accumulated image list acquisition section 123.

Herein, the network 130 is one example of a communication network. Also, the network camera 110 is one example of the network camera. Also, the PC 120 is a receiving apparatus that is one example of a distribution recipient. Also, the image pickup section 111 is one example of an image pickup device. Also, the sending and receiving section 115 is one example of a transmitter. Also, the image sending monitoring section 116 is one example of a sending monitor. Also, the accumulation memory 119 is one example of a storage device. Also, the accumulation capacity monitoring section 118 is one example of a storage monitor. Also, the image receiving section 121 is one example of a receiver.

The network camera 110 and the PC 120 are connected to the network 130. The network camera 110 is the camera connectable to the network 130. The PC 120 is a monitoring PC for perusing image data taken by the network camera 110 or a recording apparatus for recording image data.

The image pickup section 111 inputs an image signal. The signal processing section 112 performs the signal processing for the input image signal. The encoder 113 compresses the image signal subjected to the signal processing and temporarily stores the image data in the temporary memory 114. A schedule table 114a of FIG. 7 listing a schedule for one week in the network camera system 100 is also stored in the temporary memory 114, as will be described later. The sending and receiving section 115 distributes the image data stored in the temporary memory 114 and an accumulated image list 117a of FIG. 6 via the network 130 to the PC 120, as will be described later. Also, the sending and receiving section 115 receives an accumulated image acquisition request or an accumulated image list acquisition request which is sent from the PC 120, and temporarily stores it in the temporary memory 114.

The image sending monitoring section 116 monitors a state of distributing image data in the sending and receiving section 115, and notifies the accumulation processing section 117 when the distribution is interrupted. The accumulation processing section 117, upon receiving a notification of interrupted distribution from the image sending monitoring section 116, stores the image data stored in the temporary memory 114 in the accumulation memory 119. Also, the accumulation processing section 117, upon receiving an accumulated image acquisition request from the sending and receiving section 115, passes the image data stored in the accumulation memory 119 to the temporary memory 114, and temporarily stores it in the temporary memory 114. Also, the accumulation processing section 117 creates the accumulated image list 117a and temporarily stores it in the temporary memory 114.

The accumulation capacity monitoring section 118 monitors the accumulated amount of image data in the accumulation memory 1191 and notifies its result to the PC 120 via the accumulation processing section 117 and the network 130. Thereby, the PC 120 can grasp whether or not the accumulated image exists. The accumulation memory 119 may be an SD memory card or the like.

The image receiving section 121 receives the image data sent via the network 130 from the sending and receiving section 115. The accumulated image acquisition requesting section 122 sends an accumulated image acquisition request via the network 130 to the network camera 110 in the time zone when the processing load of the PC 120 is small, based on the accumulated image list 117a acquired by the accumulated image list acquisition section 123, and acquires the accumulated image sent via the network 130 from the sending and receiving section 115.

The accumulated image list acquisition section 123 sends an accumulated image list acquisition request via the network 130 to the network camera 110, and acquires the accumulated image list 117a sent via the network 130 from the sending and receiving section 115.

Figure 6:
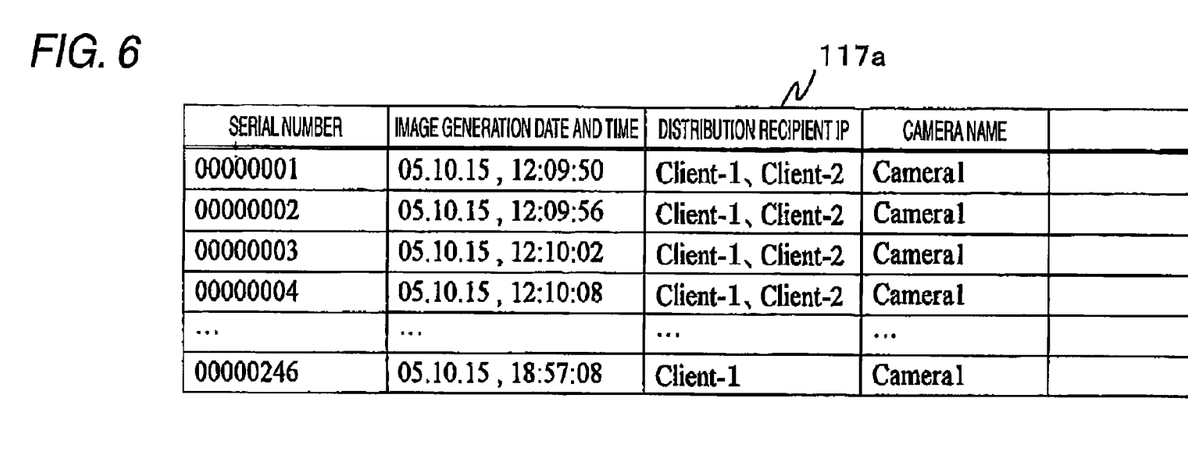
FIG. 6 is an example of an accumulated image list in the embodiment of the invention.

The accumulated image list 117a is the list having the detailed information of the accumulated image accumulated in the accumulation memory 119. The list items may include the serial number, image generation date and time, distribution recipient IP, and camera name. FIG. 6 shows one example of the accumulated image list 117a.

In FIG. 6, the serial number is the number describing the sequence starting from 1. The image generation date and time is the date and time when the image is accumulated in the accumulation memory 119. The distribution recipient IP is the IP address of the PC 120 of monitoring object for which the image sending monitoring section 116 monitors the distribution of the image at the time of accumulating the image. The camera name describes the camera name of the network camera 110 that accumulates the image among one or more network cameras 110.

Figure 7:
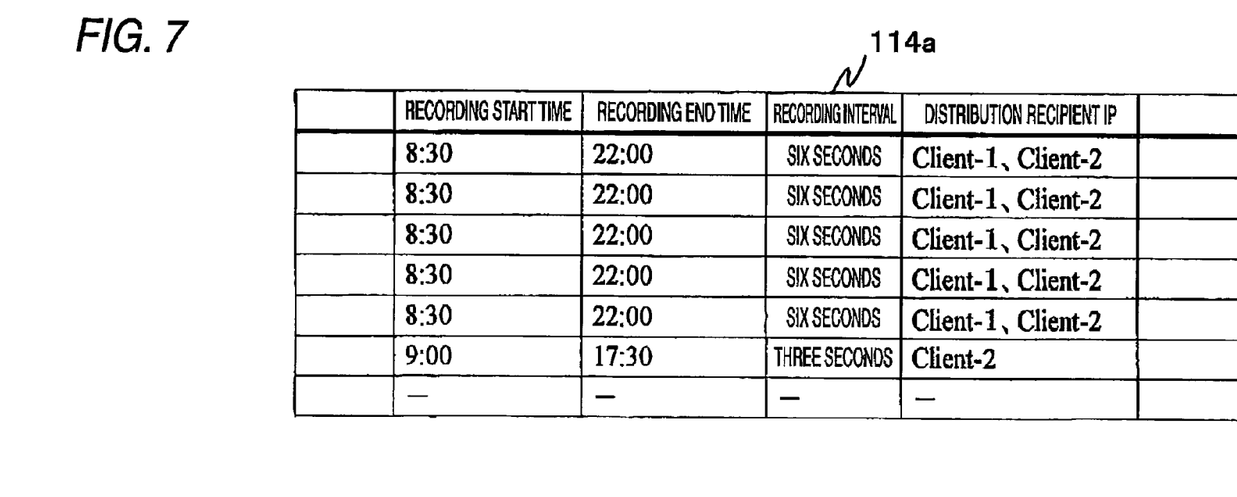
FIG. 7 is an example of a schedule table in the embodiment of the invention.

The schedule table 114a lists a schedule for one week in the network camera system 100, and has the items of the recording start time, recording end time, recording interval and distribution recipient IP. The schedule table 114a is stored in the temporary memory 114. The schedule table 114a may be created on the side of the network camera 110, or created on the side of the PC 120 and transmitted via the network 130 to the network camera 110. FIG. 7 shows one example of the schedule table 114a.

In FIG. 7, the recording start time is the start time of the recording period indicting the time zone for accumulating the image when the distribution of image by the sending and receiving section 115 is interrupted during the monitoring of the image sending monitoring section 116. The recording end time is the end time of the recording period. The recording interval describes the time interval of accumulating the image in the accumulation memory 119. The distribution recipient IP describes the IP address of the PC 120 of monitoring object for which the image sending monitoring section 116 monitors the distribution of image.

Next, a monitoring procedure for the network camera 110 to distribute the image data to the PC 120 will be described below. The methods for monitoring the distribution of image data include a method (client pull) where the PC 120 distributes a fixed amount of image data based on an image acquisition request at every fixed interval, and a method (server push) where the network camera 130 distributes the image data at a time upon one image acquisition request from the PG 120.

Figure 2:
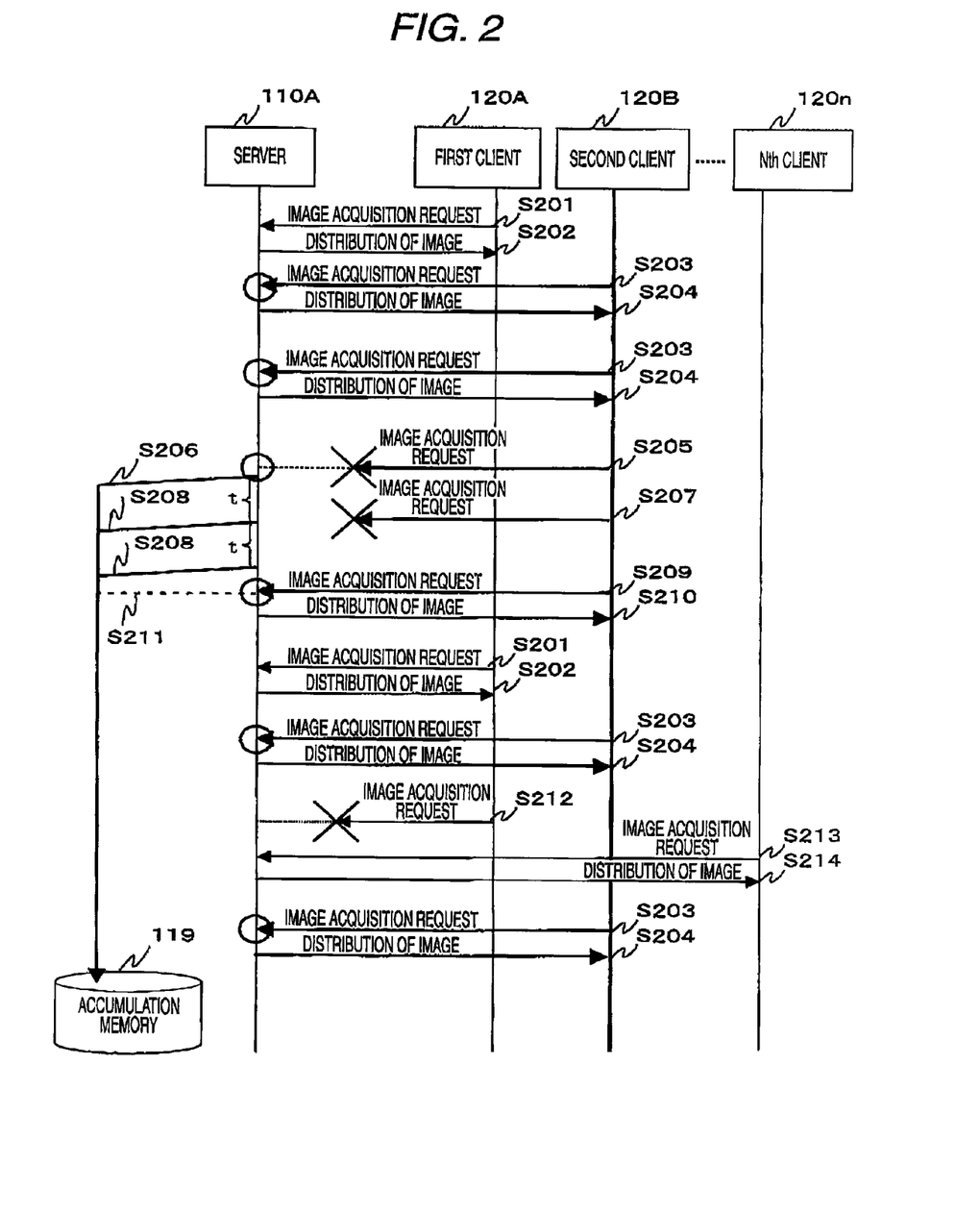
FIG. 2 is an image distribution monitoring sequence chart in the client pull in the network camera system according to the embodiment of the invention.

First of all, an image distribution monitoring procedure in the client pull will be described below. FIG. 2 is an image distribution monitoring sequence chart in the client pull of the network camera system 100 according to the embodiment of the invention. Herein, the network camera system 100 comprises a server having one or more network cameras 110 and n (n is an integer of 1 or greater) clients having one or more PCs 120, in which the image acquisition request from the second client is only monitored. Each server and each client has the same configuration and functions. It is supposed that any one of the servers is a server 110A and n clients include a first client 120A, a second client 120B, . . . , and an nth client 120n.

First of all, an image acquisition request is sent from the first client 120A to the server 110A, and detected by the server 110A (step S201), and the image is normally distributed from the server 110A to the first client 120A (step S202). Also, an image acquisition request is sent from the second client 120B to the server 110A, and detected by the server 110A (step S203), and the image is normally distributed from the server 110A to the second client 120B (step S204).

If the next image acquisition request is not detected within a preset time period in the server 110A though the image acquisition request is sent from the second client 120B to the server 110A (step S205), the server 110A starts to accumulate the image in the accumulation memory 119 because the image acquisition request from the second client 120B is monitored (step S206).

Herein, when an image acquisition request is sent from the specific client (here the second client 120B), ACK (ACKnowledgement) is sent from the server 110A to the client, when the server 110A normally receives the image acquisition request, whereby the client can know that the server 110A normally receives the image acquisition request.

After the passage of a preset time t since not detecting the image acquisition request at step S205, the second client 120B sends the image acquisition request to the server 110A again (step S207). If the image acquisition request at step S207 is not detected within the preset time period in the server 110A, the image is subsequently accumulated in the accumulation memory 119 (step S208).

After the passage of a set time t again, an image acquisition request is sent from the second client 120B to the server 110A, and detected by the server 110A (step S209), and the image is distributed from the server 110A to the second client 120B (step S210). Since the image acquisition request is normally detected at step S209, the accumulation of image in the accumulation memory 119 is stopped (step S211).

Also, when an image acquisition request is not detected within the preset time by the server 110A though the image acquisition request is sent from the first client 120A to the server 110A, the image is not accumulated in the accumulation memory 119 (step S212), because the image acquisition request from the first client 120A is not monitored.

Also, an image acquisition request is sent from the nth client 120n to the server 110A, and detected by the server 110A (step S213), and the image is normally distributed from the server 110A to the nth client 120n (step S214).

The above is the image distribution monitoring procedure in the client pull.

Figure 3:
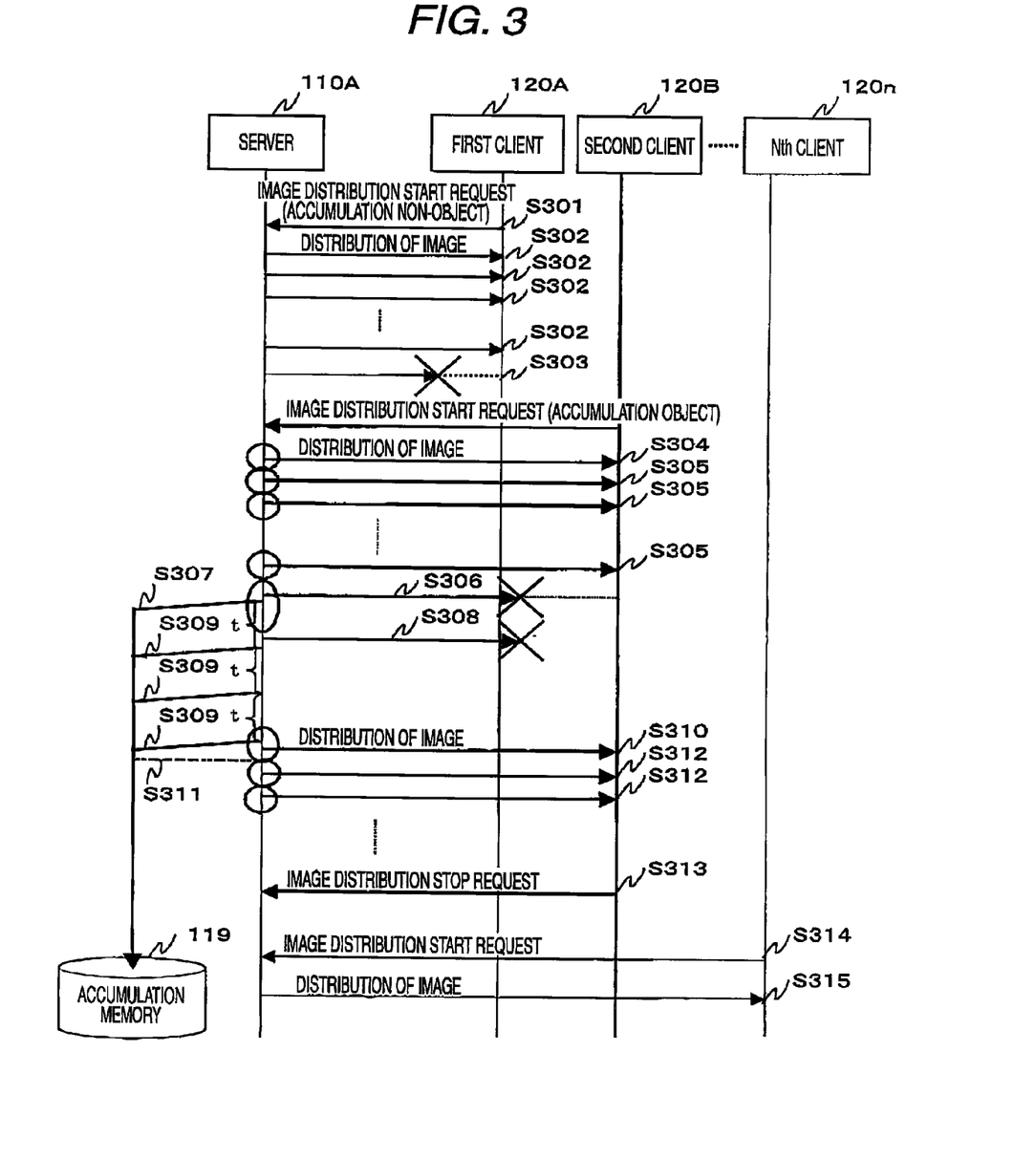
FIG. 3 is an image distribution monitoring sequence chart in the server push in the network camera system according to the embodiment of the invention.

Next, an image distribution monitoring procedure in the server push will be described below. FIG. 3 is an image distribution monitoring sequence chart in the server push of the network camera system 100 according to the embodiment of the invention. Herein, the network camera system 100 comprises the server 110A, the first client 120A, the second client 120B, . . . , and the nth client 120n, in which the distribution of image to the second client is only monitored. Each client has the same configuration and functions.

First of all, an image distribution start request is sent from the first client 120A to the server 110A (step S301), and the image is distributed from the server 111A to the first client 120A, whereby the distribution of image is continued until the server 110A receives an image distribution stop request from the first client 120A, or until the distributed image is not normally received by the first client 120A (step S302).

Herein, when each image is distributed to the specific client (here the second client 120B), ACK is transmitted from the client to the server 110A, when the client normally receives the image, whereby the server 110A can know that the client normally receives the image.

If the normal reception of image is not detected beyond a preset time while the image is distributed from the first client 120A to the server 110A, the image is not accumulated in the accumulation memory 119 because the first client 120A is the client out of the monitoring object (step S303).

Then, an image distribution start request is sent from the client 120B to the server 110A (step S304), and the image is distributed from the server 110A to the second client 120B, whereby the distribution of image is continued until the server 110A receives an image distribution stop request from the second client 120B, or until the distributed image is not normally received by the second client 120B (step S305).

If the normal reception (ACK) of image is not detected beyond the preset time while the image is distributed from to second client 120B from the server 110A (step S306), the accumulation of image in the accumulation memory 119 is started because the second client 120B is the client of the monitoring object (step S307).

After step S306 is performed, the image is redistributed from the server 110A to the second client 120B at every set interval (S308). If the second client 120B can not detect the reception of image even though the image is redistributed, the accumulation of image in the accumulation memory 119 is continued (step S309). In FIG. 3, the illustration is omitted, except for the first redistribution. This redistribution is performed until the second client 120B normally detects the reception of image, or for a preset period of time.

In redistributing the image that fails in distribution, when the second client 120B normally receives the image (step S310), the accumulation of image in the accumulation memory 119 is stopped (step S311). Thereafter, the distribution of image is continued until there is an image distribution stop request from the second client 120B or until the distributed image is not normally received by the second client 120B (step S312).

If an image distribution stop request is sent from the second client 120B to the server 110A, and detected by the server 110A, the server 110A stops the distribution of image (step S313). Also, when an image distribution start request is sent from the nth client 120n to the server 110A (step S314), the image is distributed from the server 110A to the nth client 120n, whereby the distribution of image is continued until the server 110A receives an image distribution stop request from the nth client 120n, or until the distributed image is not normally received by the nth client 120n (step S315).

The above is the image distribution monitoring procedure in the server push.

Figure 4:
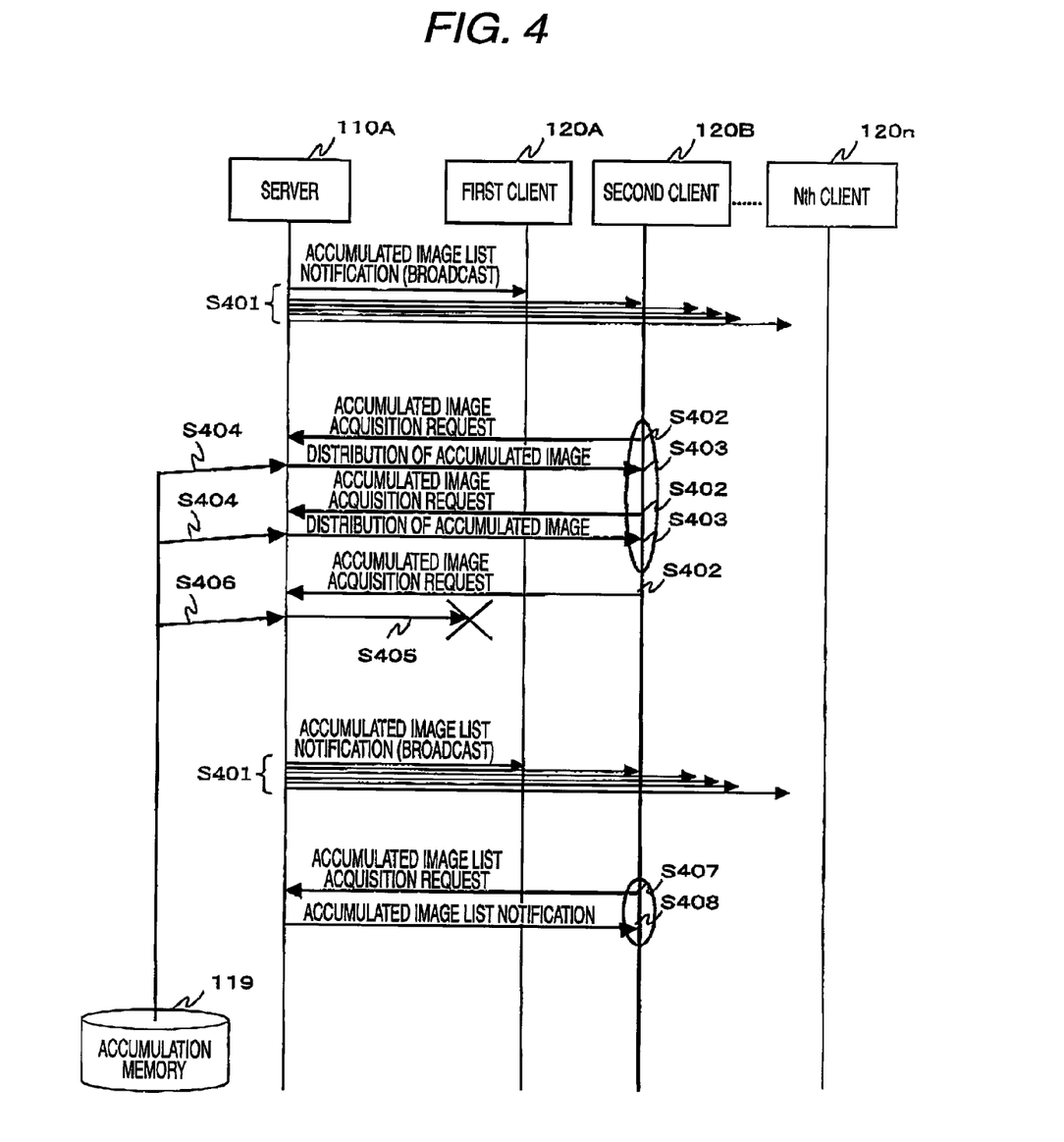
FIG. 4 is a sequence chart for accumulated image existence notification and accumulated image acquisition in the network camera system according to the embodiment of the invention.

Next, the accumulated image existence notification and accumulated image acquisition after accumulating the image in the accumulation memory 119 will be described below. FIG. 4 is a sequence chart for accumulated image existence notification and accumulated image acquisition in the network camera system 100 according to the embodiment of the invention. Herein, the network camera system 100 has the server 110A, the first client 120A, the second client 120B, . . . , and the nth client 120n, in which the second client acquires the accumulated image.

First of all, the accumulated image list 117a listing the details of accumulated image accumulated in the server 110A is broadcast to each client 120A, 120B, . . . , 120n (step S401). This broadcast notification is made at every preset interval.

The second client 120B recognizes the existence of the accumulated image by receiving the accumulated image list 117a, and transmits an accumulated image acquisition request to the server 110A in the time zone where the second client 120B itself has a light load (step S402). The server 110A receives the accumulated image acquisition request, and distributes the accumulated image to the second client 120B by taking the accumulated image out of the accumulation memory 119 (step S403). The amount of accumulated image that can be distributed at a time is predetermined. The accumulated image after completion of transmission to the second client 120B is deleted from the accumulation memory 119 (step S404).

If the distribution of the accumulated image in response to the accumulated image acquisition request at step S402 is not detected by the second client 120B (step S405), the accumulated image scheduled to transmit is not deleted from the accumulation memory 119, because the transmission of the accumulated image to the second client 120B is not completed (step S406).

Though the accumulated image list 117a is broadcast at a fixed time interval at step S401, the second client 120B may send the accumulated image list acquisition request to the server 110A (step S407), and the server 110A may notify the accumulated image list 117a in response to it (step S408), for example.

Herein, the timing at which the accumulation processing section 117 of the server 110A creates the accumulated image list 117a occurs when the accumulated image is stored into the accumulation memory in which the image is additionally written into the accumulated image list 117a, the accumulated image list acquisition request is received from each client in which the list of accumulated image in the accumulation memory 119 is created, or at every fixed time interval in which the accumulated image list 117a is updated.

The above is the procedure for accumulated image existence notification and accumulated image acquisition.

Figure 5:
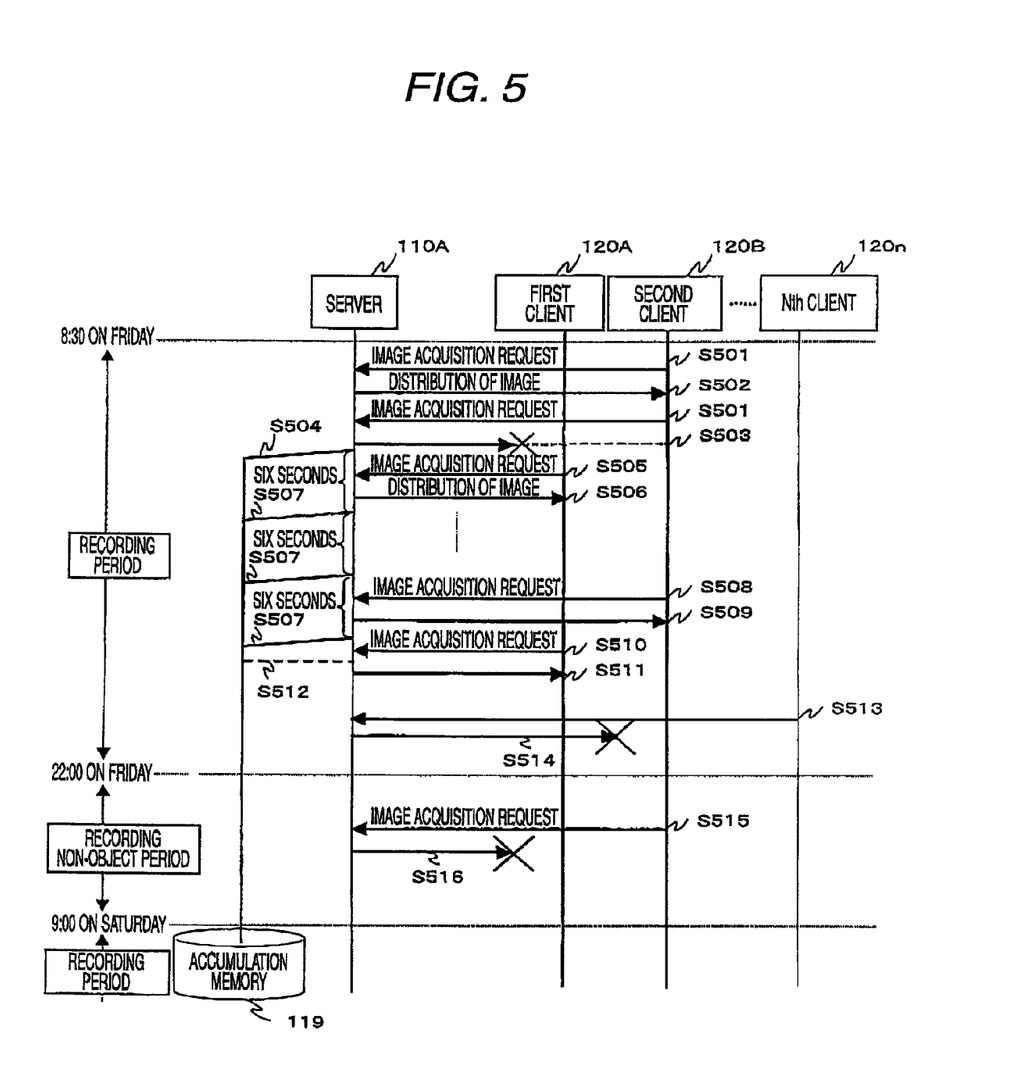
FIG. 5 is a recording sequence chart based on a recording schedule for the network camera system according to the embodiment of the invention.

Next, a recording schedule for the network camera system 100 will be described below. FIG. 5 is a recording sequence chart based on the recording schedule of the network camera system 100 according to the embodiment of the invention. Herein, the recording schedule of FIG. 7 from Friday to Saturday will be described below. Herein, the network camera system 100 has the server 110A, the first client 120A, the second client 120B, . . . , and the nth client 120n.

In FIG. 7, the recording start time is 8:30, the recording end time is 22:00, the recording interval is 6 seconds, and the distribution recipient IP is the first client 120A and the second client 120B on Friday, whereby the network camera system 100 starts to monitor the distribution of image to the first client 120A and the second client 120B at 8:30 on Friday.

In the period where the distribution of image is monitored, when an image acquisition request is sent from the second client 120B to the server 110A (step S501), the server 110A distributes the image to the second client 120B (step S502). The image acquisition request is sent at a fixed time interval. After the image acquisition request is sent from the second client 120B to the server 110A (step S501), when the second client 120B can not detect the distribution of image beyond a set time (step S503), the accumulation of image in the accumulation memory 119 is started (step S504).

The image acquisition request is sent from the first client 120A to the server 110A (step S505), and the server 110A can distribute the image to the first client 120A, but when the distribution of image to the second client 120B is interrupted, the accumulation of image in the accumulation memory 119 is continued (step S507). Since the accumulation of image in the accumulation memory 119 is made at every recording interval, the image is accumulated at every six seconds here.

If the image acquisition request is sent from the second client 120B to the server 110A (step S508), the second client 120B detects the distribution of accumulated image (step S509), the image acquisition request is sent from the first client 120 to the server 110A (step S510), and the first client 120A detects the distribution of accumulated image (step S511), that is, when the image can be distributed to both the first client 120A and the second client 120B of monitoring objects, the accumulation of image in the accumulation memory 119 is stopped (step S512).

Also, even when the nth client 120n out of monitoring object sends the image acquisition request to the server 110A (step S513) in the period where the distribution of image is monitored, the image is not distributed from the server 110A to the nth client 120n (step S514).

Also, even when the image acquisition request is sent from the second client 120B of monitoring object for image distribution to the server 110A (step S515), the image is not distributed from the server 110A to the second client 120B when the image acquisition request is out of the recording object period such as a time zone from 22:00 on Friday to 9:00 on Saturday (step S516).

The above is the recording procedure based on the recording schedule.

In this way, it is possible to efficiently utilize the capacity of accumulation memory for the network camera on the server side by setting the recording period.

Thus, with the network camera system 100 according to the embodiment of the invention, the network camera system 100 connected to the network 130 comprises the network camera 110 and a plurality of PCs 120 to which the image is distributed from the network camera 110, and the network camera 110 comprises the image pickup section 111 for picking up the image, the sending and receiving section 115 for distributing the picked up image taken by the image pickup section 111 to the PC 120, the image sending monitoring section 116 for monitoring whether or not the picked up image is distributed to the designated PC 120 among the plurality of PCs 120 by the sending and receiving section 115, and the accumulation memory 119 for accumulating the picked up image when the distribution of image to the designated PC 120 by the sending and receiving section 115 is interrupted while being monitored by the image sending monitoring section 116, in which the PC 120 has the image receiving section 121 for receiving the picked up image distributed to the designated PC 120 by the sending and receiving section 115, whereby it is possible to securely distribute the image to the designated PC 120.

Though the invention has been described above in detail with reference to the specific embodiment, it will be apparent to those skilled in the art that various changes or modifications may be made without departing from the spirit or scope of the invention.

This application is based on Japanese Patent Application No. 2005-334548, filed on Nov. 18, 2005, the contents thereof being incorporated herein by reference.

INDUSTRIAL APPLICABILITY

The invention is effective for the network camera and the network camera system in which the image can be securely distributed to the designated distribution recipient.

The invention claimed is:

1. A network camera for distributing an image to a plurality of receiving apparatuses via a communication network, comprising:
an imager which picks up the image;
a sender which distributes the image the plurality of receiving apparatuses;
a sending monitor which monitors whether or not the image is distributed to a first receiving apparatus designated among the plurality of receiving apparatuses as being monitored, and does not monitor whether or not the image is distributed to a second receiving apparatus not designated among the plurality of receiving apparatuses as being monitored; and
an accumulator which accumulates the image via a communication line other than the communication network when the distribution of the image to the first receiving apparatus is interrupted while being monitored by the sending monitor, and does not accumulate the image when the distribution of the image to the second receiving apparatus is interrupted.

2. The network camera according to claim 1, wherein the accumulator stops the accumulation of the image when the sender restarts to distribute the image to the first receiving apparatus.

3. The network camera according to claim 1, further comprising:
accumulation start information which includes a time from interruption of the distribution to the first receiving apparatus to the start of accumulation by the accumulator,
wherein the accumulator starts the accumulation of the image based on the accumulation start information when the distribution to the first receiving apparatus is interrupted.

4. The network camera according to claim 1, further comprising:
accumulation interval information which includes a time interval at which the accumulator accumulates the image,
wherein the accumulator decides the time interval of accumulating the image based on the accumulation interval information when the distribution to the first receiving apparatus is interrupted.

5. The network camera according to claim 1, further comprising:
an accumulation monitor which notifies the first receiving apparatus that the image is accumulated by the accumulator.

6. The network camera according to claim 1, further comprising:
recording time information which includes a recording period indicating a monitoring time zone of monitoring the distribution of the image to the first receiving apparatus by the sending monitor,
wherein the accumulator decides a period of accumulating the image based on the recording time information, when the distribution to the first receiving apparatus is interrupted.

7. The network camera according to any one of claim 1, further comprising:
recording interval information which includes a recording interval indicating a time interval of monitoring the distribution of the image to the first receiving apparatus by the sending monitor,
wherein the accumulator decides a time interval of accumulating the image based on the recording interval information, when the distribution to the first receiving apparatus is interrupted.

8. A network camera system connected to a communication network, comprising:
a network camera; and
a plurality of receiving apparatuses to which an image is distributed from the network camera via the communication network,
wherein the network camera which includes:
an imager which picks up the image;
a sender which distributes the image taken by the imager to the plurality of receiving apparatuses;
a sending monitor which monitors whether or not the image is distributed to a first receiving apparatus designated among the plurality of receiving apparatuses as being monitored, and does not monitor whether or not the image is distributed to a second receiving apparatus not designated among the plurality of receiving apparatuses as being monitored; and
an accumulator which accumulates the image via a communication line other than the communication network when the distribution of the image to the first receiving apparatus is interrupted while being monitored by the sending monitor, and does not accumulate the image when the distribution of the image to the second receiving apparatus is interrupted; and
wherein the first receiving apparatus includes:
a receiver which receives the image distributed to the first receiving apparatus by the sender.

9. A monitoring method used in a network camera system connected to a communication network and comprising a network camera and a plurality of receiving apparatuses to which an image is distributed from the network camera via the communication network, the method comprising:
an image pickup step of picking up the image;
a sending step of distributing the image taken at the image pickup process to the plurality of receiving apparatuses via the communication network;
a sending monitoring step of monitoring whether or not the image is distributed to a first receiving apparatus, which is designated among the plurality of receiving apparatuses as being monitored, at the sending process; and
an accumulating step of accumulating the image via a communication line other than the communication network when the distribution to the first receiving apparatus at the sending process is interrupted at the sending monitoring process, and not accumulating the image when the distribution of the image to a second receiving apparatus, which is not designated among the plurality of receiving apparatuses as being monitored, is interrupted; and
a receiving step of receiving the image distributed to the first receiving apparatus at the sending process.

* * * * *